(12) United States Patent
Cornett et al.

(10) Patent No.: US 8,457,179 B2
(45) Date of Patent: Jun. 4, 2013

(54) DEVICES, METHODS, AND SYSTEMS FOR BUILDING MONITORING

(75) Inventors: Alan Cornett, Morristown, NJ (US); Robert C. Becker, Morristown, NJ (US); Jerome P. Drexler, Morristown, NJ (US); Conrad Ihla, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 334 days.

(21) Appl. No.: 12/880,912

(22) Filed: Sep. 13, 2010

(65) Prior Publication Data

US 2012/0063518 A1    Mar. 15, 2012

(51) Int. Cl.
*H04B 1/40* (2006.01)
(52) U.S. Cl.
USPC .......................................... 375/219; 375/220
(58) Field of Classification Search
USPC .......................................................... 375/219
See application file for complete search history.

(56) References Cited

U.S. PATENT DOCUMENTS

| | | | | |
|---|---|---|---|---|
| 4,097,692 | A * | 6/1978 | Felix | 370/436 |
| 6,006,071 | A * | 12/1999 | Roberts et al. | 455/63.1 |
| 6,404,348 | B1 * | 6/2002 | Wilfong | 340/657 |
| 6,726,099 | B2 | 4/2004 | Becker et al. | |
| 6,885,334 | B1 | 4/2005 | Hager et al. | |
| 7,044,387 | B2 | 5/2006 | Becker et al. | |
| 7,156,312 | B2 | 1/2007 | Becker et al. | |
| 7,199,572 | B1 * | 4/2007 | May | 324/156 |
| 7,298,251 | B2 | 11/2007 | Meyers et al. | |
| 7,333,003 | B1 * | 2/2008 | Landry et al. | 375/258 |
| 7,335,871 | B2 | 2/2008 | Bauhahn et al. | |
| 7,401,740 | B2 | 7/2008 | Becker et al. | |
| 7,463,187 | B2 | 12/2008 | Becker et al. | |
| 7,477,707 | B2 | 1/2009 | Kazi et al. | |
| 7,573,272 | B2 | 8/2009 | Becker et al. | |
| 7,573,370 | B2 | 8/2009 | Becker et al. | |
| 7,584,048 | B2 | 9/2009 | Pham et al. | |
| 7,612,519 | B2 * | 11/2009 | Smith | 318/788 |
| 7,667,353 | B2 * | 2/2010 | Coolidge et al. | 307/127 |
| 7,701,384 | B2 | 4/2010 | Becker et al. | |
| 7,730,776 | B2 | 6/2010 | Cornett et al. | |
| 7,741,958 | B2 * | 6/2010 | Brandt et al. | 375/257 |
| 7,777,668 | B2 | 8/2010 | Becker et al. | |
| 7,886,173 | B2 * | 2/2011 | Krieger et al. | 713/330 |
| 8,080,900 | B2 * | 12/2011 | Corhodzic et al. | 307/66 |
| 2002/0046248 | A1 | 4/2002 | Drexler | |
| 2004/0046016 | A1 | 3/2004 | Becker et al. | |
| 2004/0046642 | A1 | 3/2004 | Becker et al. | |
| 2004/0046643 | A1 | 3/2004 | Becker et al. | |
| 2004/0048579 | A1 | 3/2004 | Becker et al. | |
| 2006/0071791 | A1 | 4/2006 | Meyers et al. | |
| 2006/0089759 | A1 | 4/2006 | Becker | |

(Continued)

*Primary Examiner* — Sam K Ahn
*Assistant Examiner* — Santiago Garcia
(74) *Attorney, Agent, or Firm* — Brooks, Cameron & Huebsch, PLLC

(57) ABSTRACT

Devices, methods, and systems for building monitoring are described herein. One or more embodiments include a first transceiver coupled to a first phase of a power system of a building and configured to receive and send data over the first phase of the power system, a second transceiver coupled to a second phase of the power system and configured to receive and send data over the second phase of the power system, and a switch coupled to the first and second transceivers of the power system and configured to route data between the first and second transceivers of the power system.

17 Claims, 3 Drawing Sheets

U.S. PATENT DOCUMENTS

| | | |
|---|---|---|
| 2006/0145833 A1* | 7/2006 | Brandt et al. ............ 340/538.11 |
| 2006/0158035 A1* | 7/2006 | Brandt et al. .................... 307/3 |
| 2006/0164251 A1 | 7/2006 | Meyers et al. |
| 2007/0080788 A1 | 4/2007 | Manley et al. |
| 2007/0084987 A1 | 4/2007 | Bauhahn et al. |
| 2007/0098104 A1 | 5/2007 | Becker |
| 2007/0180338 A1 | 8/2007 | Becker et al. |
| 2007/0189425 A1 | 8/2007 | Becker |
| 2007/0278860 A1* | 12/2007 | Krieger et al. .................. 307/64 |
| 2008/0022575 A1 | 1/2008 | Drexler et al. |
| 2008/0030078 A1* | 2/2008 | Whitted et al. ................. 307/66 |
| 2008/0074308 A1 | 3/2008 | Becker et al. |
| 2008/0082258 A1 | 4/2008 | Pham et al. |
| 2008/0137266 A1* | 6/2008 | Jensen et al. .................. 361/602 |
| 2008/0172744 A1 | 7/2008 | Schmidt et al. |
| 2008/0186145 A1 | 8/2008 | Manley et al. |
| 2008/0204054 A1* | 8/2008 | Wells ............................ 324/713 |
| 2008/0304595 A1* | 12/2008 | Haug et al. .................... 375/316 |
| 2009/0095401 A1 | 4/2009 | Tucker et al. |
| 2009/0139091 A1 | 6/2009 | Tucker et al. |
| 2009/0146894 A1 | 6/2009 | Drexler et al. |
| 2009/0146895 A1 | 6/2009 | Drexler et al. |
| 2009/0155747 A1 | 6/2009 | Cornett et al. |
| 2009/0157293 A1 | 6/2009 | Cornett et al. |
| 2009/0219524 A1 | 9/2009 | Wang et al. |
| 2009/0251358 A1 | 10/2009 | Becker et al. |
| 2009/0251359 A1 | 10/2009 | Becker et al. |
| 2009/0308923 A1 | 12/2009 | Cornett et al. |
| 2009/0314078 A1 | 12/2009 | Cornett et al. |
| 2009/0319189 A1 | 12/2009 | Cornett et al. |
| 2010/0004913 A1 | 1/2010 | Becker et al. |
| 2010/0014066 A1 | 1/2010 | Becker et al. |
| 2010/0085241 A1 | 4/2010 | Meyers et al. |
| 2010/0102992 A1 | 4/2010 | Cornett et al. |
| 2010/0161257 A1 | 6/2010 | Cornett et al. |
| 2010/0172701 A1 | 7/2010 | Tucker et al. |
| 2010/0175573 A1 | 7/2010 | Cornett et al. |
| 2010/0204919 A1 | 8/2010 | Becker et al. |
| 2010/0262393 A1* | 10/2010 | Sharma et al. .................. 702/79 |
| 2011/0307418 A1* | 12/2011 | Bouzaglo ...................... 705/412 |
| 2012/0075754 A1* | 3/2012 | Jayanth et al. .................. 361/26 |
| 2012/0123711 A1* | 5/2012 | Fausak et al. ................... 702/62 |
| 2012/0214536 A1* | 8/2012 | Kim et al. ..................... 455/522 |

* cited by examiner

DEVICES, METHODS, AND SYSTEMS FOR BUILDING MONITORING

TECHNICAL FIELD

The present disclosure relates to devices, methods, and systems for building monitoring.

BACKGROUND

Monitoring equipment, such as, for example, sensors and/or detectors, located in a building can be used to monitor the conditions of the building, e.g., one or more rooms in the building. For example, a temperature sensor located in a building can sense the temperature of the building, and a smoke detector located in a building can detect the presence of smoke in the building.

Further, control equipment, e.g., control devices, can be used to adjust the conditions of the building based on the data sensed and/or detected by the monitoring equipment. For example, if a temperature sensor located in a building senses a temperature in the building that is higher than a desired temperature for the building, a control device can activate a cooling system of the building to lower the temperature of the building to the desired temperature. Additionally, if a smoke detector located in a building detects smoke in the building, a control device can activate a sprinkler system of the building.

Such monitoring and/or control equipment, however, may not be supportable by and/or compatible with the original and/or existing infrastructure of a building. That is, such monitoring and/or control equipment may not be able to be a part of and/or may not be able to use the original and/or existing infrastructure of a building. Accordingly, in order to install and/or use such monitoring and/or control equipment in a building, additional and/or new infrastructure that can support the monitoring and/or control equipment may need to be added to the building.

The addition of such additional and/or new infrastructure to a building, however, may be expensive and/or difficult. Areas in which this may be expensive or difficult can be cost of equipment and/or building redesign, time in hours for workers, down time for portions of the building or systems, design of the building, and/or accessibility of building areas, among other areas.

DETAILED DESCRIPTION

Figure 1:
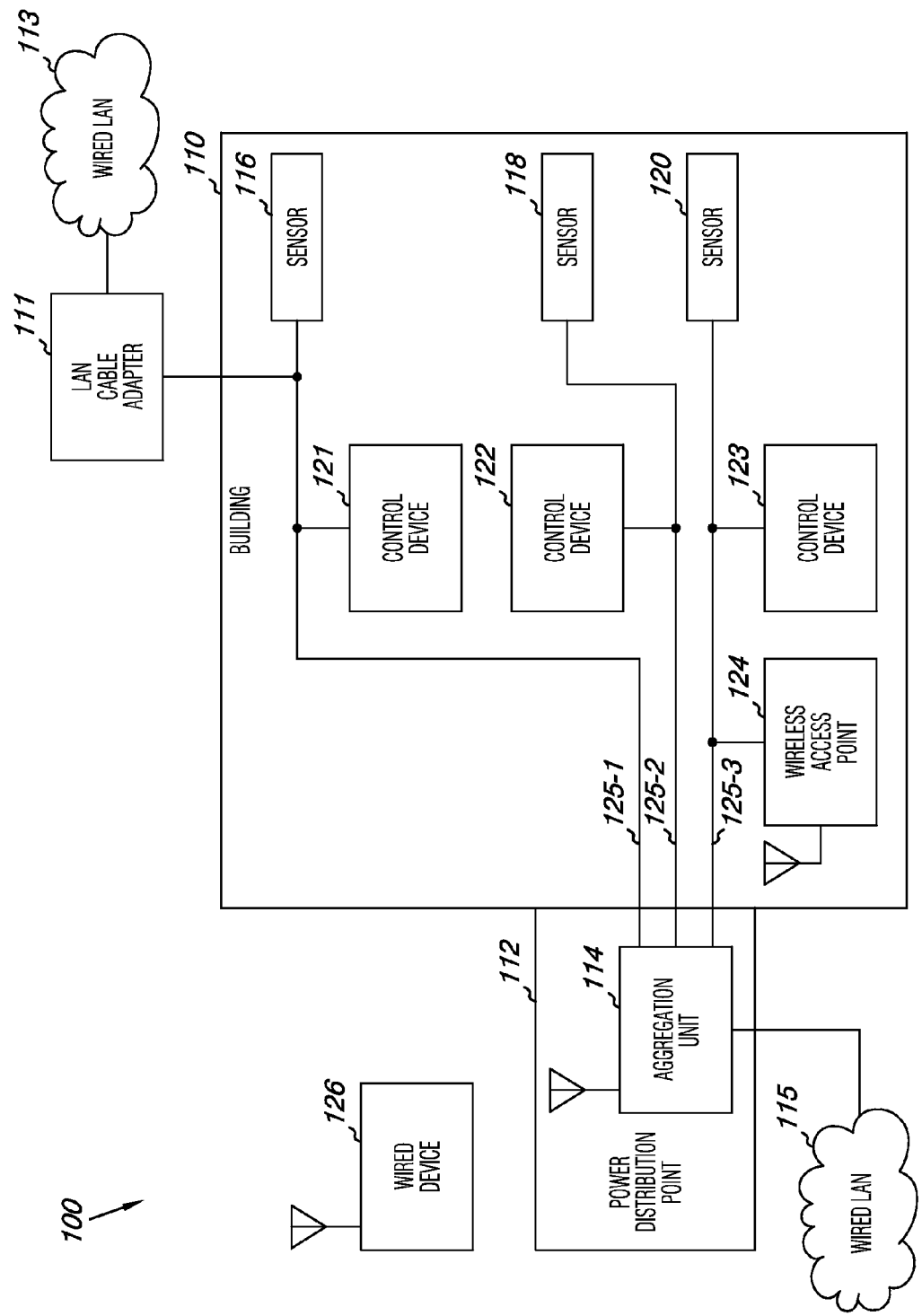
FIG. 1 illustrates a system for building monitoring in accordance with one or more embodiments of the present disclosure.

Devices, methods, and systems for building monitoring are described herein. One or more embodiments include a first transceiver coupled to a first phase of a power system of a building and configured to receive and send data over the first phase of the power system, a second transceiver coupled to a second phase of the power system and configured to receive and send data over the second phase of the power system, and a switch coupled to the first and second transceivers of the power system and configured to route data between the first and second transceivers of the power system.

Building monitoring devices, methods, and systems in accordance with one or more embodiments of the present disclosure may utilize minimal or no additional and/or new infrastructure to be added to the building being monitored in order to support the building monitoring devices, methods, and systems. Rather, building monitoring devices, methods, and systems in accordance with one or more embodiments of the present disclosure may be supportable by and/or compatible with the original and/or existing infrastructure of the building being monitored. Accordingly, the installation and/or use of building monitoring devices, methods, and systems in accordance with one or more embodiments of the present disclosure may be less expensive and/or less difficult than previous techniques.

In the following detailed description, reference is made to the accompanying drawings that form a part hereof. The drawings show by way of illustration how one or more embodiments of the disclosure may be practiced. These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 114 may reference element "14" in FIG. 1, and a similar element may be referenced as 214 in FIG. 2.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present invention, and should not be taken in a limiting sense.

As used herein, "a" or "a number of" something can refer to one or more such things. For example, "a number of sensors" can refer to one or more sensors.

FIG. 1 illustrates a system 100 for building monitoring in accordance with one or more embodiments of the present disclosure. As shown in FIG. 1, system 100 includes a building 110. That is, system 100 can be used for monitoring building 110, e.g., one or more rooms in building 110. For example, system 100 can monitor the conditions of building 110, such as, for instance, the temperature of building 110, the amount of power used in building 110, whether there is smoke in building 110, and/or whether there is motion in building 110, among other building conditions.

As shown in FIG. 1, system 100 includes sensors 116, 118, and 120 located in building 110. As an example, each sensor 116, 118, 120 can be located in a different room of building 110. However, embodiments of the present disclosure are not limited to a particular location for sensors 116, 118, and 120 in building 110. Additionally, although FIG. 1 illustrates three sensors located in building 110, embodiments of the present disclosure are not limited to a particular number of sensors. That is, system 100 can include any number of sensors located in building 110.

Sensors 116, 118, and 120 can be any type of sensor and/or detector device that can be used to monitor, e.g., sense and/or detect, one or more conditions of building 110. For example, sensors 116, 118, and/or 120 can be temperature sensors that sense the temperature of building 110, power sensors that sense the amount of power used in building 110, smoke detectors that detect the presence of smoke in building 110, and/or motion detectors that detect the presence of motion in building 110, among other types of sensors and/or detectors. However, embodiments of the present disclosure are not limited to a particular type(s) of sensor or detector or to a particular type(s) of sensed or detected data. Sensors 116, 118, and 120 will be further described herein, e.g., with respect to FIG. 3.

As shown in FIG. 1, sensor 116 is coupled to a first phase 125-1 of a power system of building 110, sensor 118 is coupled to a second phase 125-2 of the power system of building 110, and sensor 120 is coupled to a third phase 125-3 of the power system of building 110. That is, building 110 includes a power system having three different phases associated therewith, e.g., phases 125-1, 125-2, and 125-3.

Each phase 125-1, 125-2, and 125-3 of the power system of building 110 can be a circuit conductor carrying an alternating current (AC), with each AC reaching its peak value at different times. For example, first phase 125-1 of the power system can be a first circuit conductor carrying a first AC, second phase 125-2 of the power system can be a second circuit conductor carrying a second AC that is delayed by one third of one cycle of the first AC, and third phase 125-3 of the power system can be a third circuit conductor carrying a third AC that is delayed by one third of one cycle of the second AC, e.g., by two thirds of one cycle of the first AC.

The power system of building 110 can be a power line communication (PLC) network. That is, the circuit conductors of each phase 125-1, 125-2, and 125-3 of the power system can carry data, such as, for example, data from sensors 116, 118, and 120, as will be further described herein. The data can be carried by the circuit conductors by, for example, impressing a modulated carrier signal containing the data on the circuit conductors.

As shown in FIG. 1, system 100 includes an aggregation unit 114 located at a power distribution point 112 of building 110. Power distribution point 112 can be a location at which power is distributed to building 110, such as, for example, a power meter. Power distribution point 112 can be located adjacent to building 110, as illustrated in FIG. 1. However, embodiments of the present disclosure are not limited to a particular type of power distribution point, or to a particular location for power distribution point 112 or aggregation unit 114.

Aggregation unit 114 can receive data, e.g., temperature data, power use data, and/or data indicating the presence of smoke and/or motion, among other building condition data, sensed by sensor 116 from sensor 116 over first phase 125-1 of the power system of building 110. Similarly, aggregation unit 114 can also receive data sensed by sensors 118 and 120 from sensors 118 and 120 over second phase 125-2 and third phase 125-3, respectively, of the power system. That is, sensor 116 can send sensed data to aggregation unit 114 over first phase 125-1 of the power system, sensor 118 can send sensed data to aggregation unit 114 over second phase 125-2 of the power system, and sensor 120 can send sensed data to aggregation unit 114 over third phase 125-3 of the power system.

Aggregation unit 114 can route the data received from sensors 116, 118, and/or 120 between phases 125-1, 125-2, and 125-3 of the power system. For instance, aggregation unit 114 can route the data received from sensors 116, 118, and/or 120 to a single phase of the power system. For example, aggregation unit 114 can route the data received from sensor 116 from first phase 125-1 to second phase 125-2, and aggregation unit 114 can also route the data received from sensor 120 from third phase 125-3 to second phase 125-2. As an additional example, aggregation unit 114 can route the data received from sensors 116 and 118 from first phase 125-1 and second phase 125-2, respectively, to third phase 125-3.

After routing the data received from sensors 116, 118, and/or 120 between phases 125-1, 125-2, and 125-3 of the power system, aggregation unit 114 can send the data to one or more control devices coupled to phases 125-1, 125-2, and/or 125-3 over phases 125-1, 125-2, and/or 125-3. For example, as shown in FIG. 1, system 100 includes control devices 121, 122, and 123 located in building 110 and coupled to first phase 125-1, second phase 125-2, and third phase 125-3, respectively, of the power system of building 110. After routing the data received from sensors 116 and 120 to second phase 125-2 of the power system, aggregation unit 114 can send the data to control device 122 over second phase 125-2. That is, control device 122 can receive the data from aggregation unit 114 over second phase 125-2. Additionally, after routing the data received from sensors 118 and 120 to first phase 125-1 of the power system, aggregation unit 114 can send the data to control device 121 over first phase 125-1, and after routing the data received from sensors 116 and 118 to third phase 125-3 of the power system, aggregation unit can send the data to control device 123 over third phase 125-3.

Control devices 121, 122, and/or 123 can adjust the conditions of building 110 based on the data received from aggregation unit 114, e.g., from sensors 116, 118, and/or 120. For example, if the data indicates that the temperature of building 110 is higher than a desired temperature, control devices 121, 122, and/or 123 can activate a cooling system of building 110 to lower the temperature of building 110 to the desired temperature. Further, if the data indicates that smoke is present in the building, control devices 121, 122, and/or 123 can, for example, activate a sprinkler and/or alarm system of the building. Additionally and/or alternatively, control devices 121, 122, and 123 can present the data to a user of the respective control device (not shown in FIG. 1), and the user can adjust the conditions of building 110 based on the data using the respective control device and/or some other means.

Control devices 121, 122, and 123 can be computing devices, such as, for example, desktop or laptop computing devices. Additionally, control devices 121, 122, and 123 can be coupled to any outlet of the power system in building 110. For example, control device 122 can be coupled to second phase 125-2 of the power system through any outlet of second phase 125-2.

Further, control devices 121, 122, and 123 can be in communication with a wired device located outside building 110 via a wired network. For example, control device 121 can be in communication with wired device 126 via wired local area network (LAN) 113 and a LAN cable adapter 111 coupled to first phase 125-1 of the power system, as shown in FIG. 1. That is, wired device 126 can access control device 121, e.g., the data received by control device 121, via wired LAN 113 and LAN cable adapter 111. Wired device 126 can be a computing device, such as, for example, a desktop or laptop computing device. Control devices 121, 122, and 123 will be further described herein, e.g., with respect to FIG. 4.

After routing the data received from sensors 116, 118, and/or 120 between phases 125-1, 125-2, and 125-3 of the power system, aggregation unit 114 can also send the data to a wireless access point coupled to a phase of the power system over the phase. For example, as shown in FIG. 1, system 100 includes a wireless access point 124 located in building 110 and coupled to third phase 125-3 of the power system of building 110. After routing the data received from sensors 116 and 118 to third phase 125-3 of the power system, aggregation unit 114 can send the data to wireless access point 124 over third phase 125-3. That is, wireless access point 124 can receive the data from aggregation unit 114 over third phase 125-3.

After receiving the data from aggregation unit 114, wireless access point 124 can send the data to a wireless device within range of wireless access point 124 (not shown in FIG. 1). That is, the wireless device can access the data via wireless access point 124. The wireless device can be located inside or outside building 110. In some embodiments, the wireless device can be, for example, a cellular telephone or a mobile device (e.g., a mobile phone, a personal digital assistant, etc.), among other types of wireless devices.

Aggregation unit 114 can also send the data to a wired device, e.g., wired device 126, via a wired network, e.g., wired LAN 115 shown in FIG. 1. That is, wired device 126 can also access the data via aggregation unit 114. In some embodiments, aggregation unit 114 can send the data directly to wired device 126, e.g., without sending the data to wireless access point 124 and/or control devices 121, 122, or 123. Aggregation unit 114 will be further described herein, e.g., with respect to FIG. 2.

As shown in FIG. 1, wired device 126 can be located outside building 110. That is, wired device 126 can access the data without being inside building 110. Accordingly, a user of wired device 126 can monitor the conditions of building 110 without having to enter building 110.

Although FIG. 1 illustrates control device 121 coupled to first phase 125-1 of the power system of building 110, control device 122 coupled to second phase 125-2 of the power system, control device 123 coupled to third phase 125-3 of the power system, and wireless access point 124 coupled to third phase 125-3 of the power system, embodiments of the present disclosure are not limited to this particular control device and wireless access point configuration. That is, any number of control devices and/or wireless access points can be coupled to any of phases 125-1, 125-2, and 125-3 of the power system of building 110.

Because system 100, e.g., the elements of system 100, uses the power system of building 110, system 100 can be supportable and/or compatible with the original and/or existing infrastructure of building 110. That is, minimal or no additional and/or new infrastructure may need to be added to building 110 in order to support system 100. Accordingly, the installation and/or use of system 100 may be less expensive and/or less difficult than previous techniques.

Additionally, system 100, e.g., aggregation unit 114, can route the data received from sensors 116, 118, and/or 120 between phases 125-1, 125-2, and 125-3 of the power system of building 110, as previously described above. Accordingly, system 100 can use all phases 125-1, 125-2, and 125-3 of the power system, and a user can access system 100, e.g., the data sensed and/or detected by sensors 116, 118, and 120, via any of phases 125-1, 125-2, and 125-3. That is, a user can access the data sensed and/or detected by sensors 116, 118, and 120 from any point in building 110.

Figure 2:
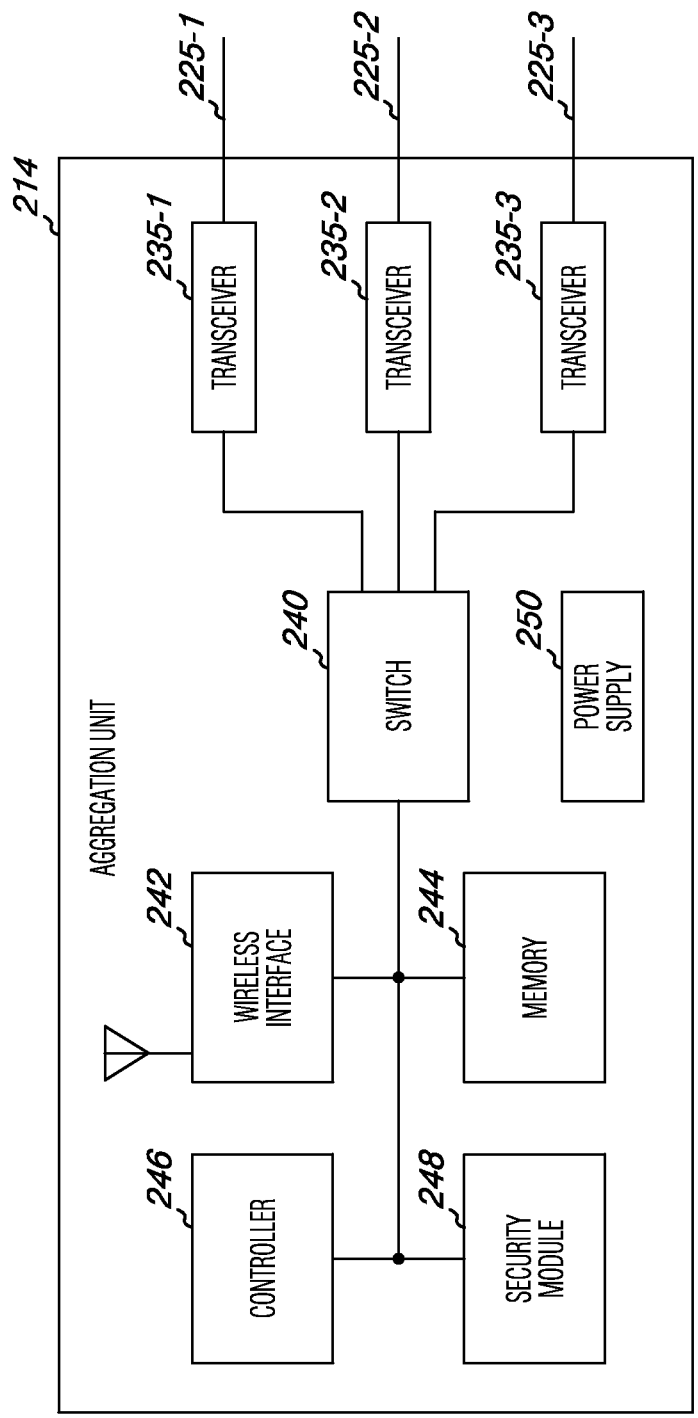
FIG. 2 illustrates an aggregation unit in accordance with one or more embodiments of the present disclosure.

FIG. 2 illustrates an aggregation unit 214 in accordance with one or more embodiments of the present disclosure. Aggregation unit 214 can be, for example, aggregation unit 114 previously described in connection with FIG. 1.

As shown in FIG. 2, aggregation unit 214 includes a first transceiver 235-1 coupled to a first phase 225-1 of a power system, a second transceiver 235-2 coupled to a second phase 225-2 of the power system, and a third transceiver 235-3 coupled to a third phase 225-3 of the power system. Phases 225-1, 225-2, and 225-3 of the power system can correspond to phases 125-1, 125-2, and 125-3, respectively, of the power system of building 110 previously described in connection with FIG. 1.

Transceivers 235-1, 235-2, and 235-3 can receive and send data over first phase 225-1, second phase 225-2, and third phase 225-3, respectively, of the power system. For example, transceiver 235-1 can receive data sensed by sensor 116 (previously described in connection with FIG. 1) from sensor 116 over first phase 225-1 of the power system, transceiver 235-2 can receive data sensed by sensor 118 (previously described in connection with FIG. 1) from sensor 118 over second phase 225-2 of the power system, and transceiver 235-3 can receive data sensed by sensor 120 (previously described in connection with FIG. 1) from sensor 120 over third phase 225-3 of the power system.

As shown in FIG. 2, aggregation unit 214 includes a switch 240 coupled to transceivers 235-1, 235-2, and 235-3. Switch 240 can route the data received by transceivers 235-1, 235-2, and 235-3 between transceivers 235-1, 235-2, and 235-3. That is, switch 240 can route the data received by transceivers 235-1, 235-2, and 235-3 between phases 225-1, 225-2, and 225-3 of the power system. For instance, switch 240 can route the data received by transceivers 235-1, 235-2, and 235-3 to a single transceiver, e.g., to a single phase of the power system.

For example, switch 240 can route the data received by transceiver 235-1 from transceiver 235-1 to transceiver 235-2, and switch 240 can also route the data received by transceiver 235-3 from transceiver 235-3 to transceiver 235-2. That is, switch 240 can route the data received by transceivers 2351 and 235-3 from first phase 225-1 and third phase 225-3, respectively, to second phase 225-2. As an additional example, switch 240 can route the data received by transceivers 235-1 and 235-2 from transceivers 235-1 and 235-2, respectively, to transceiver 235-3. That is, switch 240 can route the data received by transceivers 235-1 and 235-2 from first phase 225-1 and third phase 225-3, respectively, to second phase 225-2.

After switch 240 routes the data received by transceivers 235-1, 235-2, and/or 235-3 between transceivers 235-1, 235-2, and 235-3, transceivers 235-1, 235-2, and/or 235-3 can send the data, over phases 225-1, 225-2, and/or 225-3 of the power system, to one or more control devices coupled to phases 225-1, 225-2, and/or 225-3 of the power system. For example, after switch 240 routes the data received by transceivers 235-1 and 235-3 to transceiver 235-2, transceiver 235-2 can send the data to control device 122 (previously described in connection with FIG. 1) over second phase 225-2 of the power system. As additional examples, after switch 240 routes the data received by transceivers 235-2 and 235-3 to transceiver 235-1, transceiver 235-1 can send the data to control device 121 (previously described in connection with FIG. 1) over first phase 225-1 of the power system, and after switch 240 routes the data received by transceivers 235-1 and 235-2 to transceiver 235-3, transceiver 235-3 can send the data to control device 123 (previously described in connection with FIG. 1) over third phase 225-3 of the power system.

After switch 240 routes the data received by transceivers 235-1, 235-2, and/or 235-3 between transceivers 235-1, 235-2, and 235-3, transceivers 235-1, 235-2 and/or 235-3 can also send the data, over phases 225-1, 225-2, and/or 225-3 of the power system, to a wireless access point coupled to the phases 225-1, 225-2, and/or 225-3 of the power system. For example, after switch 240 routes the data received by transceivers 235-1 and 235-2 to transceiver 235-3, transceiver 235-3 can send the data to wireless access point 124 (previously described in connection with FIG. 1) over third phase 225-3 of the power system.

As shown in FIG. 2, aggregation unit 214 includes a wireless interface 242 coupled to switch 240. Switch 240 can send the data received by transceivers 235-1, 235-2, and/or 235-3 to wireless interface 242. Wireless interface 242 can then send the data to a wireless or wired device via a wireless or wired network. For example, wireless interface 242 can send the data to wireless device 126 previously described in connection with FIG. 1 via wired LAN 115 previously described in connection with FIG. 1.

As shown in FIG. 2, aggregation unit 214 includes a memory 244 and a controller, e.g., processor, 246 coupled to switch 240. Memory 244 can be any type of storage medium that can be accessed by controller 246 to perform various examples of the present disclosure. For example, memory 244 can be a non-transitory computer readable medium having computer readable instructions, e.g., computer program instructions, stored thereon that are executable by controller 246 to perform various examples of the present disclosure.

Memory 244 can be volatile or nonvolatile memory. Memory 244 can also be removable, e.g., portable, memory, or non-removable, e.g., internal, memory. For example, memory 244 can be random access memory (RAM), read-only memory (ROM), dynamic random access memory (DRAM), electrically erasable programmable read-only memory (EEPROM), flash memory, phase change random access memory (PCRAM), compact-disk read-only memory (CD-ROM), a laser disk, a digital versatile disk (DVD) or other optical disk storage, and/or a magnetic medium such as magnetic cassettes, tapes, or disks, among other types of memory.

Further, although memory 244 is illustrated as being located in aggregation unit 214, embodiments of the present disclosure are not so limited. For example, memory 244 can also be located internal to another computing resource, e.g., enabling the computer readable instructions to be downloaded over the Internet or another wired or wireless connection.

Memory 244 can store the data received by transceivers 235-1, 235-2, and/or 235-3. Subsequent to the data being stored in memory 244, the data can be sent to wireless interface 242 and then a wireless or wired device, as previously described herein. Subsequent to the data being stored in memory 244, the data can also be routed between transceivers 235-1, 235-2, and 235-3 and sent to a control device and/or a wireless access point, as previously described herein.

For example, subsequent to the data being stored in memory 244, the data can be routed to transceiver 235-2, and transceiver 235-2 can send the data to control device 122 (previously described in connection with FIG. 1) over second phase 225-2 of the power system, as previously described herein. As an additional example, subsequent to the data being stored in memory 244, the data can be routed to transceiver 235-3, and transceiver 235-3 can send the data to wireless access point 124 (previously described in connection with FIG. 1) over third phase 225-3 of the power system, as previously described herein.

As shown in FIG. 2, aggregation unit 214 includes a security module 248 coupled to switch 240. Security module 248 can limit access to aggregation unit 214, e.g., access to the data received by transceivers 235-1, 235-2, and 235-3 and/or stored in memory 244, to users who are authorized to access aggregation unit 214. That is, security module 248 can prevent users who are not authorized to access aggregation unit 214 from accessing aggregation unit 214.

For example, security module 248 can require a user to provide security information, such as, for example a user name and/or password, among other security information, in order for the user to access aggregation unit 214. If the user is attempting to access aggregation unit 214 via control devices 121, 122, or 123, or via wireless device 126, (previously described in connection with FIG. 1), the user can provide the security information via control devices 121, 122, or 123, or via wireless device 126. After the user provides the security information, security module 248 can allow the user to access aggregation unit 214, e.g., the data received by transceivers 235-1, 235-2 and 235-3 and/or stored in memory 244 can be sent to control devices 121, 122, or 123, or wireless device 126.

As shown in FIG. 2, aggregation unit 214 includes a power supply 250. Power supply 250 can be, for example, a high-voltage alternating current (HVAC) power supply. Power supply 250 can also optionally include a battery backup.

Figure 3:
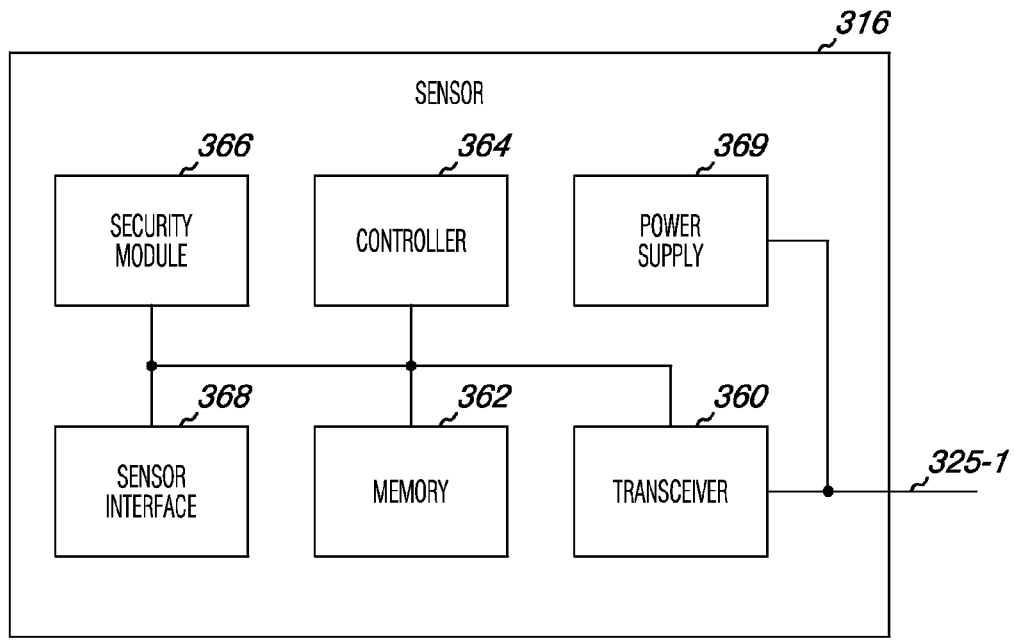
FIG. 3 illustrates a sensor in accordance with one or more embodiments of the present disclosure.

FIG. 3 illustrates a sensor 316 in accordance with one or more embodiments of the present disclosure. Sensor 316 can be, for example, sensor 116 previously described in connection with FIG. 1.

As shown in FIG. 3, sensor 316 includes a transceiver 360 coupled to a first phase 325-1 of a power system. First phase 325-1 of the power system can correspond to first phase 125-1 of the power system of building 110 previously described in connection with FIG. 1, and/or first phase 225-1 of the power system previously described in connection with FIG. 2. Transceiver 360 can receive and send data over first phase 325-1 of the power system.

For example, as shown in FIG. 3, sensor 316 includes a sensor interface 368 coupled to transceiver 360. Sensor interface 368 can sense data associated with a building (e.g., building 110 previously described in connection with FIG. 1) such as, for example, temperature data, power use data, and/or data indicating the presence of smoke and/or motion, among other types of data. Transceiver 360 can send the data sensed by sensor interface 368 to aggregation units 114 and/or 214 (previously described in connection with FIGS. 1 and 2, respectively), e.g., to transceiver 235-1 of aggregation unit 214, over first phase 325-1 of the power system.

Transceiver 360 can automatically send the sensed data to aggregation units 114 and/or 214. Additionally and/or alternatively, sensor 316, e.g., transceiver 360, can receive a request from aggregation units 114 and/or 214 for data sensed by sensor 316, and transceiver 360 can send the sensed data to aggregation units 114 and/or 214 in response to the request.

As shown in FIG. 3, sensor 316 includes a memory 362 and a controller, e.g., processor, 364 coupled to transceiver 360. Memory 362 can be any type of storage medium that can be accessed by controller 364 to perform various examples of the present disclosure, in a manner analogous to memory 244 previously described in connection with FIG. 2. Memory 362 can be volatile or nonvolatile, and/or removable or non-removable, in a manner analogous to memory 244. Further, although memory 362 is illustrated as being located in sensor 316, embodiments of the present disclosure are not so limited, in a manner analogous to memory 244.

Memory 362 can store data sensed by sensor interface 368. Subsequent to the data being stored in memory 362, the data can be sent to aggregation units 114 and/or 214 by transceiver 360, as previously described herein. For example, the data stored in memory 362 can be sent to aggregation units 114 and/or 214 in response to a request from aggregation units 114 and/or 214, as previously described herein.

As shown in FIG. 3, sensor 316 includes a security module 366 coupled to transceiver 360. Security module 366 can limit access to sensor 316 (e.g., access to the data sensed by sensor interface 368, sent or received by transceiver 360, and/or stored in memory 362) to users who are authorized to access sensor 316. That is, security module 366 can prevent users who are not authorized to access sensor 316 from accessing sensor 316. For example, security module 366 can require a user to provide security information in order for the user to access sensor 316, in a manner analogous to security module 248 previously described in connection with FIG. 2.

As shown in FIG. 3, sensor 316 includes a power supply 369 coupled to first phase 325-1 of the power system. Power supply 369 can optionally include a battery backup.

Sensors 118 and/or 120 previously described in connection with FIG. 1 can be analogous to sensor 316. That is, sensors 118 and/or 120 can include components coupled to second phase 125-2 and third phase 125-3, respectively, of a power system that are analogous to the components of sensor 316 previously described herein.

Figure 4:
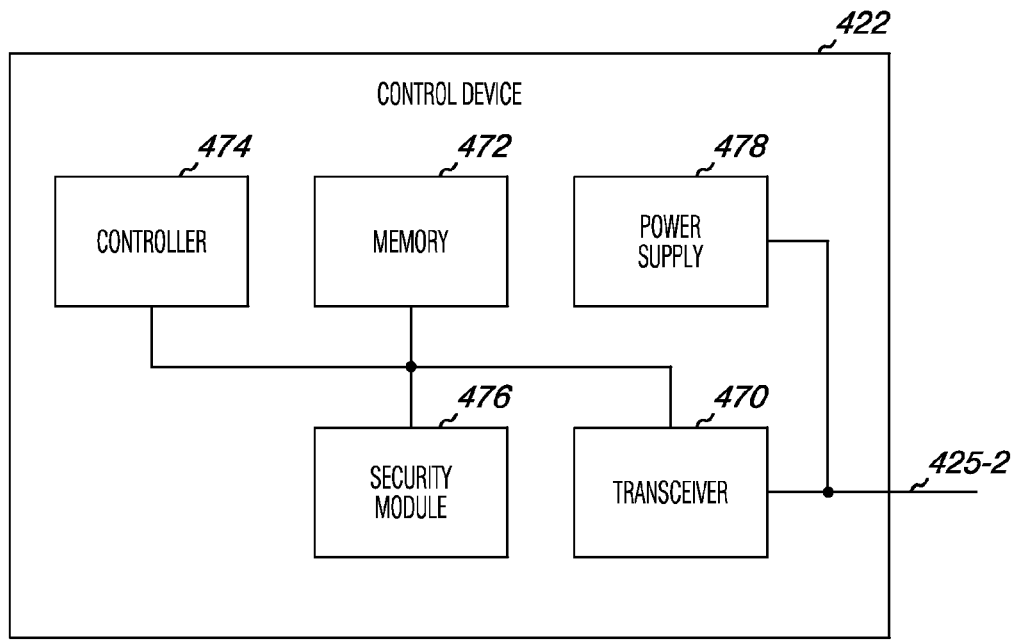
FIG. 4 illustrates a control device in accordance with one or more embodiments of the present disclosure.

FIG. 4 illustrates a control device 422 in accordance with one or more embodiments of the present disclosure. Control device 422 can be, for example, control device 122 previously described in connection with FIG. 1.

As shown in FIG. 4, control device 422 includes a transceiver 470 coupled to a second phase 425-2 of a power system. Second phase 425-2 of the power system can correspond to second phase 125-2 of the power system of building 110 previously described in connection with FIG. 1, and/or second phase 225-2 of the power system previously described in connection with FIG. 2.

Transceiver 470 can receive and send data over second phase 425-2 of the power system. For example, transceiver 470 can receive data sensed by sensors 116, 118, and/or 120 (previously described in connection with FIG. 1) and/or sensor 316 (previously described in connection with FIG. 3) from aggregation units 114 and/or 214 (previously described in connection with FIGS. 1 and 2, respectively), e.g., from transceiver 235-2 of aggregation unit 214, over second phase 425-2 of the power system.

Control device 422 can adjust the conditions of a building (e.g., building 110 previously described in connection with FIG. 1) based on the data received from aggregation units 114 and/or 214, in a manner analogous to control device 122 previously described in connection with FIG. 1. Additionally and/or alternatively, control device 422 can present the data to a user of control device 422 (not shown in FIG. 4), and the user can adjust the conditions of the building based on the data using control device 422 and/or some other means, in a manner analogous to control device 122.

As shown in FIG. 4, control device 422 includes a memory 472 and a controller, e.g., processor, 474 coupled to transceiver 470. Memory 472 can be any type of storage medium that can be accessed by controller 474 to perform various examples of the present disclosure, in a manner analogous to memory 244 previously described in connection with FIG. 2 and/or memory 362 previously described in connection with FIG. 3. Memory 472 can be volatile or nonvolatile, and/or removable or non-removable, in a manner analogous to memories 244 and/or 362. Further, although memory 472 is illustrated as being located in control device 422, embodiments of the present disclosure are not so limited, in a manner analogous to memories 244 and/or 362.

Memory 472 can store the data received by transceiver 470. Subsequent to the data being stored in memory 472, control device 422 can adjust the conditions of a building based on the stored data, as previously described herein. Additionally, subsequent to the data being stored in memory 472, a user of control device 422 can access the stored data and adjust the conditions of the building based on the stored data, as previously described herein.

As shown in FIG. 4, control device 422 includes a security module 476 coupled to transceiver 470. Security module 476 can limit access to control device 422 (e.g., access to the data received by transceiver 470 and/or stored in memory 472) to users who are authorized to access control device 422, in a manner analogous to security module 366 previously described in connection with FIG. 3.

As shown in FIG. 4, control device 422 includes a power supply 478 coupled to second phase 425-2 of the power system. Power supply 478 can optionally include a battery backup.

Control devices 121 and/or 123 previously described in connection with FIG. 1 can be analogous to control device 422. That is, control devices 121 and/or 123 can include components coupled to first phase 125-1 and third phase 125-3, respectively, of a power system that are analogous to the components of control device 422 previously described herein.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A device for building monitoring, comprising:
   a first transceiver coupled to a first phase of a power system of a building and configured to receive and send data over the first phase of the power system, wherein the data received over the first phase of the power system by the first transceiver includes data from a first sensor;
   a second transceiver coupled to a second phase of the power system and configured to receive and send data over the second phase of the power system, wherein the data sent over the second phase of the power system by the second transceiver includes data sent to a control device;
   a third transceiver coupled to a third phase of the power system and configured to receive and send data over the third phase of the power system, wherein the data received over the third phase of the power system by the third transceiver includes data from a second sensor; and
   a switch coupled to the first, second, and third transceivers of the power system and configured to route data between the first, second, and third transceivers of the power system, wherein the data routed between the first, second, and third transceivers of the power system includes:
the data from the first sensor being routed from the first transceiver to the second transceiver; and
the data from the second sensor being routed from the third transceiver to the second transceiver; and
wherein the data sent to the control device over the second phase of the power system by the second transceiver includes the data from the first sensor and the data from the second sensor.

2. The device of claim 1, wherein the device includes a wireless interface coupled to the switch, wherein the wireless interface is configured to send data received by the first and second transceivers of the power system to a wireless or wired device.

3. The device of claim 1, wherein the device includes a memory coupled to the switch, wherein the memory is configured to store data received by the first and second transceivers of the power system.

4. The device of claim 1, wherein the power system is a power line communication network.

5. The device of claim 1, wherein the device is located at a power distribution point of the building.

6. A method for building monitoring, comprising:
receiving data from a sensor over a first phase of a power system of a building;
routing the data from the first phase of the power system to a second phase of the power system;
sending the data to a control device over the second phase of the power system;
receiving data from an additional sensor over a third phase of the power system;
routing the data received from the additional sensor from the third phase of the power system to the second phase of the power system; and
sending the data received from the additional sensor to the control device over the second phase of the power system.

7. The method of claim 6, wherein the method includes:
storing the data received from the sensor; and
sending the data received from the sensor to the control device subsequent to storing the data received from the sensor.

8. The method of claim 6, wherein the method includes:
storing the data received from the sensor; and
sending the data received from the sensor to a wireless or wired device subsequent to storing the data received from the sensor.

9. The method of claim 8, wherein sending the data received from the sensor to the wireless device includes:
sending the data received from the sensor to a wireless access point over the first or second phase of the power system; and
sending the data received from the sensor from the wireless access point to the wireless device.

10. A system for building monitoring, comprising:
a sensor coupled to a first phase of a power system of a building;
a control device coupled to a second phase of the power system;
a wireless access point coupled to a third phase of the power system; and
an aggregation unit coupled to the first, second, and third phases of the power system, wherein the aggregation unit includes:
a first transceiver coupled to the first phase of the power system and configured to receive data from the sensor over the first phase of the power system;
a second transceiver coupled to the second phase of the power system and configured to send data to the control device over the second phase of the power system;
a third transceiver coupled to the third phase of the power system, wherein the third transceiver is configured to send data to the wireless access point over the third phase of the power system; and
a switch coupled to the first, second, and third transceivers of the power system and configured to:
route data from the first transceiver of the power system to the second transceiver of the power system; and
route data from the first and second transceivers of the power system to the third transceiver of the power system.

11. The system of claim 10, wherein the wireless access point is configured to send data to a wireless device.

12. The system of claim 10, wherein the sensor is configured to send sensed data to the first transceiver of the power system in response to a request from the aggregation unit.

13. The system of claim 10, wherein the sensor is configured to automatically send sensed data to the first transceiver of the power system.

14. The system of claim 10, wherein the sensor is configured to:
store sensed data; and
send the sensed data to the first transceiver of the power system subsequent to storing the sensed data.

15. The system of claim 10, wherein the sensor includes a transceiver coupled to the first phase of the power system and configured to send data to the first transceiver over the first phase of the power system.

16. The system of claim 10, wherein the control device includes a transceiver coupled to the second phase of the power system and configured to receive data from the second transceiver over the second phase of the power system.

17. The system of claim 10, wherein the control device is coupled to an outlet of the power system in the building.

* * * * *